(12) United States Patent
Kanakubo (10) Patent No.: US 7,605,576 B2
(45) Date of Patent: Oct. 20, 2009

(54) SWITCHING POWER SUPPLY DEVICE

(75) Inventor: Yoshihide Kanakubo, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 260 days.

(21) Appl. No.: 11/848,149

(22) Filed: Aug. 30, 2007

(65) Prior Publication Data

US 2009/0058388 A1    Mar. 5, 2009

(30) Foreign Application Priority Data

Aug. 31, 2006    (JP) .............................. 2006-236969

(51) Int. Cl.
G05F 1/40    (2006.01)
G05F 1/24    (2006.01)

(52) U.S. Cl. .................. 323/285; 323/225; 323/259
(58) Field of Classification Search .................. 323/259, 323/282, 284, 285, 288, 225
See application file for complete search history.

(56) References Cited

U.S. PATENT DOCUMENTS

| | | | | |
|---|---|---|---|---|
| 6,531,856 | B2 * | 3/2003 | Sakiyama et al. | 323/288 |
| 6,808,607 | B2 * | 10/2004 | Christie | 204/298.08 |
| 7,498,783 | B2 * | 3/2009 | Johnson | 323/282 |

* cited by examiner

*Primary Examiner*—Jessica Han
(74) *Attorney, Agent, or Firm*—John J. Patti; Wade J. Brady, III; Frederick J. Telecky, Jr.

(57) ABSTRACT

This invention prevents undershoot, etc., occurring in the output during the transition from intermittent control mode to continuous control mode to hinder stability, responsiveness, and low power consumption.

15 Claims, 7 Drawing Sheets

SWITCHING POWER SUPPLY DEVICE

The invention relates generally to a DC-DC switching power supply device; and, in particular, to output voltage control when shifting from the intermittent control mode of a pulse frequency modulation (PFM) system to the continuous control mode of a pulse width modulation (PWM) system.

BACKGROUND

In general, a portable electronic device is equipped with a DC-DC converter used to convert the voltage generated by the battery to the desired power supply voltage of the electronic circuit. The battery voltage varies as a function of the amount of remaining power. For example, the voltage of a lithium ion battery varies in the range of 3-4.2 V. Also, if an external power supply, such as an AC adapter, is used without an incorporated battery, a voltage of about 5 V may be input instead of the battery voltage. The DC-DC converter can generate a constant output voltage despite the variation in the input voltage.

There are three types of DC-DC converters: step-up, step-down, and step-up/step-down. The step-down type is used when the lower limit of the input voltage is higher than the target value of the output voltage. The step-up type is used when the upper limit of the input voltage is lower than the target value of the output voltage. The step-up/step-down type is used when the input voltage may be lower or higher than the output voltage.

In order to reduce consumption of the battery in portable electronic devices as much as possible, a standby mode is adopted, in which part of the circuit operation is stopped when the device is not in use. Since the load on the DC-DC converter is very low in the standby mode, a pulse frequency modulation (PFM) system can save more power than a pulse width modulation (PWM) system that constantly switches at a prescribed period.

An example of the PFM type DC-DC converter (also known as a switching regulator) is disclosed in JP Patent Publication 11-235023 (1999) (JP Patent Application 10-036181 (1998)). This reference discloses a technology for reducing the ripple voltage when the power supply voltage is high by adopting power supply voltage dependence for the PFM duty ratio. An example of the PWM type switching regulator is disclosed in JP Patent No. 3556652. This reference discloses a PWM type switching regulator with high voltage conversion efficiency.

In general, in a DC-DC converter, a voltage corresponding to the difference between the input voltage and output voltage is applied to an inductor that manages the energy converting operation. In the PFM system, the period in which the voltage is applied to the inductor is fixed at one cycle of the switching operation. The output voltage is controlled by varying the repetition rate of the fixed period. Since the PFM type switching operation is basically an intermittent operation, it is difficult to keep the output voltage constant for high loads when the power consumption of the device connected to the output terminal is high. However, the output voltage can be kept constant at low loads, and the power consumption is low and the efficiency is high because of the intermittent operation. On the other hand, in the PWM system, the period of the switching operation is fixed, and the output voltage is controlled by controlling the duty ratio in which the switch-on pulse width varies during the period. Since the PWM type switching operation is basically an intermittent operation, it can handle high loads. In this case, the high power consumption will not become a serious problem since the power consumption of the load is also high. For low loads, however, the high power consumption will lead to low efficiency.

A switching regulator that switches the PFM system and PWM system corresponding to the magnitude of the load is known. As described in Japanese Patent No. 3556652, the PWM type switching power supply device has a GM amplifier, which feeds back its output voltage and controls the duty ratio of the switching operation corresponding to the level of the output voltage. A capacitor with a relatively large capacitance (for example, on the order of nF) used for phase compensation is connected to the output of the GM amplifier. Since the charging voltage of this capacitor is held when the PWM operation is stopped immediately before switching to PFM operation, the charging voltage does not have the appropriate value when the system enters PFM operation or when it switches from the PFM operation to PWM operation. Consequently, it takes time to start and stabilize the PWM feedback circuit (analog circuit). If the operating mode is changed from PFM to PWM before the analog circuit stabilizes, the output voltage will be overshot or undershot, making it impossible to output a continuous constant voltage. Therefore, a time delay is needed until the system switches from PFM operation to PWM operation after a high load is detected. In this case, however, the operating frequency of the PFM control circuit increases instantaneously corresponding to the high load, making it difficult to make a smooth mode transition.

An object of the invention is to solve the aforementioned problem by providing a switching power supply device that can make a smooth transition from the intermittent control mode to the continuous control mode, has a stable output voltage, and can suppress unnecessary power consumption as much as possible.

SUMMARY

The invention is implemented in one aspect by a switching power supply device that comprises a power input terminal and a power output terminal; an inductor arranged between the input terminal and output terminal; plural switch elements used for switching the power input path to the inductor and the power output path from the inductor; a switch control circuit that has a control level signal whose control level corresponds to the difference between the output voltage, which is converted from the input voltage applied to the input terminal and output from the output terminal, and a prescribed target value, controls the output voltage to approach the target value based on the control level signal by turning on or off the plural switch elements, and can switch between an intermittent control mode and a continuous control mode based on an input mode signal; a capacitor connected to the voltage generation node for the control level signal in the switch control circuit during the continuous control mode; a voltage generating circuit that detects the level difference between the input voltage or output voltage and the target value and generates an ideal voltage corresponding to the detection result; and a capacitor-connecting switch that connects and disconnects the capacitor and from the generation node for the control level signal based on the mode signal, connects the capacitor to the output of the voltage generating circuit while it is disconnected from the PWM circuit and prepares the ideal voltage generated at the output for the next connection and presets it for the capacitor.

Preferably, the voltage generating circuit includes an input level judgment circuit that uses the target voltage (or a voltage proportional to the target voltage) as a reference voltage, varies the reference voltage and compares it with the input voltage, and obtains an output indicating the input signal level from the comparison result; and a calculating circuit that calculates and outputs the ideal voltage from the output of the input level judgment circuit.

DESCRIPTION OF EXAMPLE EMBODIMENTS

In accordance with the invention, a smooth transition from an intermittent control mode to a continuous control mode can be realized. Also, the output voltage is stable, and unnecessary power consumption can be suppressed as much as possible. An implementation of the principles of the invention in the form of an example embodiment of a switching power supply device that controls the output of a battery is described with reference to FIGS. 1-3.

Figure 1:
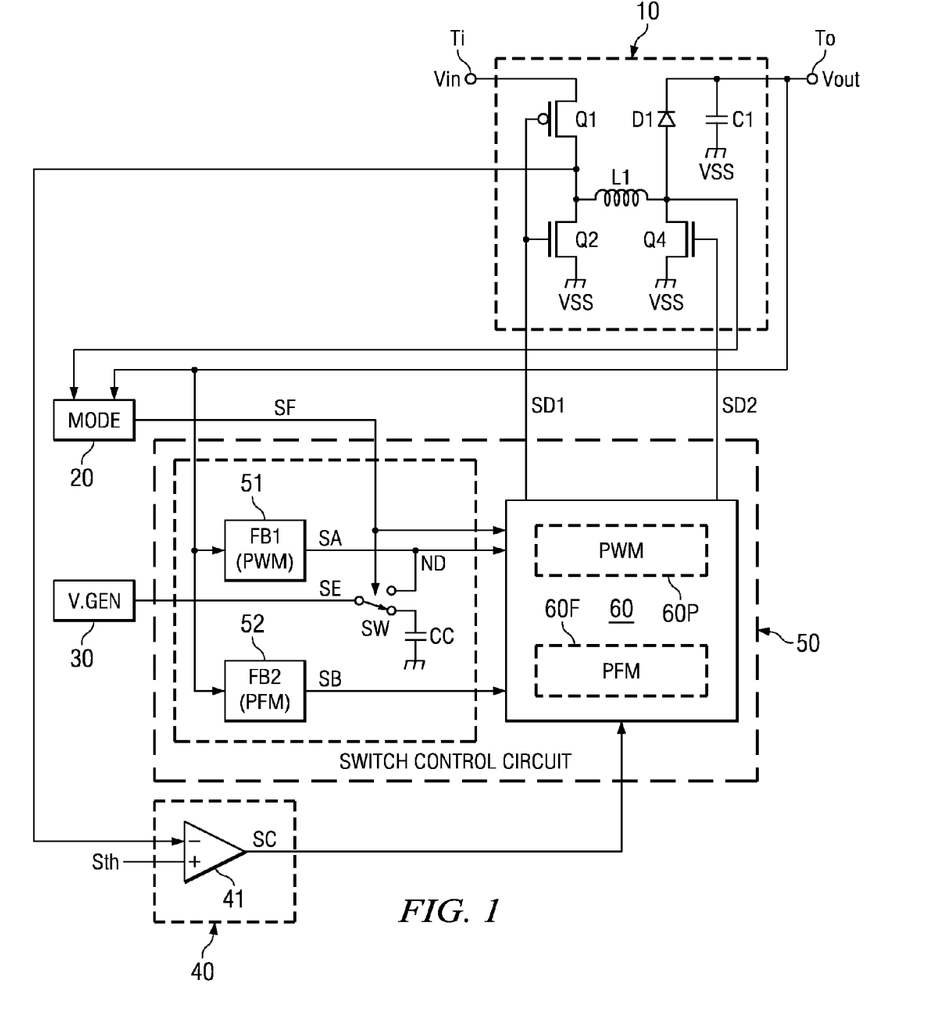
FIG. 1 illustrates a switching power supply device in accordance with an embodiment of the invention.

The switching power supply device shown in FIG. 1 has a switching converter circuit 10, an operating mode judgment circuit (MODE) 20, a voltage generating circuit (V.GEN) 30, a current judgment circuit 40, and a switch control circuit 50. Switch control circuit 50 is equipped with PWM control part 60P and PFM control part 60F. These parts constitute main control part 60 that controls the switch element (transistor) in switching converter circuit 10. Switch control circuit 50 has a PWM feedback circuit (FB1) 51 as a "first feedback circuit," which feeds back output voltage Vout and uses it for PWM control and generates a voltage difference (first control level signal) corresponding to the difference between the output voltage Vout and target value. Also, switch control circuit 50 has a PFM feedback circuit (FB2) 52 as a "second feedback circuit," which feeds back the output voltage Vout and uses it for PFM control and generates a voltage difference (second control level signal) corresponding to the difference between the output voltage Vout and the target value. In addition, switch control circuit 50 comprises a capacitor CC connected between the output of the PWM feedback circuit 51 and a power supply reference potential (referred to as VSS potential hereinafter). A capacitor-connecting switch SW serves to switch the capacitor CC between connection to and disconnection from the output of PWM feedback circuit 51. In this embodiment, reference potential VSS may be considered equivalent to ground potential and is represented by a circuit ground symbol. Capacitor-connecting switch SW is configured and adapted so that capacitor CC is connected to the output of voltage generating circuit 30 when capacitor CC is not connected to the output of PWM feedback circuit 51.

Figure 2:
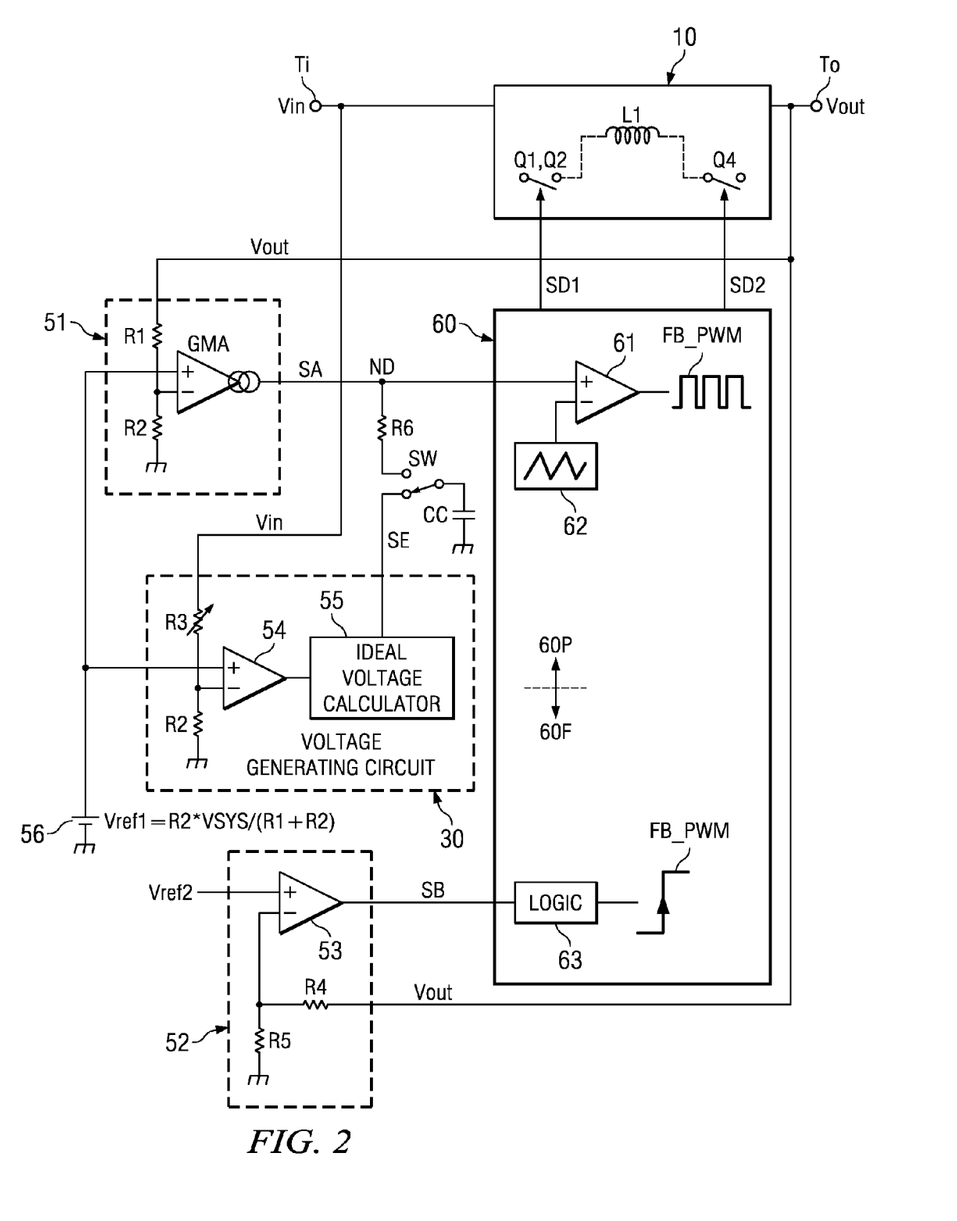
FIG. 2 is a circuit diagram illustrating parts of FIG. 1.

FIG. 2 shows further details for example implementations of the voltage generating circuit 30, PWM feedback circuit 51, PFM feedback circuit 52, and main control part 60 shown in FIG. 1.

Details of the switching converter circuit 10, operating mode judgment circuit 20, current judgment circuit 40, PWM feedback circuit 51, PFM feedback circuit 52, capacitor CC and capacitor-connecting switch SW, voltage generating circuit 30, and main control part 60 are given below:

Switching Converter Circuit 10:

As shown in FIG. 1, switching converter circuit 10 steps up or steps down the input voltage Vin applied to input terminal Ti with a switching operation, and outputs it as the output voltage Vout at output terminal To. Switching converter circuit 10 includes at least one inductor L1 and can step up or step down voltage Vin by alternately repeating the state of storing the current input from input terminal Ti in inductor L1 (first state) and the state of releasing the current stored in inductor L1 from output terminal To (second state).

As shown in FIG. 1, switching converter circuit 10 comprises inductor L1, p-type MOS transistor Q1, n-type MOS transistors Q2, Q4, diode D1, and a capacitor C1 for smoothing the output. The source of MOS transistor Q1 is connected to input terminal Ti, and its drain is connected to one of end of inductor L1. The source of MOS transistor Q2 is connected to reference potential VSS, and its drain is connected to one end of inductor L1 and the drain of MOS transistor Q1. The cathode of diode D1 is connected to output terminal To, and its anode is connected to the other end of inductor L1. The source of MOS transistor Q4 is connected to reference potential VSS, and its drain is connected to the other end of inductor L1 and to the anode of diode D1. Capacitor C1 is connected between output terminal To and reference potential VSS.

Switching converter circuit 10 shown in FIG. 1 can step voltage up or down. In the case of stepping down voltage, MOS transistor Q4 remains turned off, and MOS transistors Q1, Q2 are complementarily turned on or off (see FIG. 4). In the case of stepping up voltage, MOS transistor Q1 is kept on, MOS transistor Q2 is kept off, and MOS transistor Q4 is turned on or off (see FIG. 5).

Operating Mode Judgment Circuit 20:

Operating mode judgment circuit 20 monitors the voltage across diode D1 and detects the amount of current supplied from the voltage value to the output. If the amount of the current supplied to the output is below a certain threshold value, the load is identified as a low load, and the control mode is set to PFM mode (intermittent control mode). On the other hand, if the amount of current supplied to the output exceeds the threshold value, the load is identified as a high load, and the control mode is set to PWM mode (continuous control mode). Operating mode judgment circuit 20 dynamically controls the switching between the two modes according to the variation in the current magnitude supplied to the output. The control of capacitor-connecting switch SW and main control part 60 corresponding to mode signal SF output from operating mode judgment circuit 20 is described below.

Current Judgment Circuit 40:

Current judgment circuit 40 detects excess current by determining whether the current flowing through the inductor L1 in switching converter circuit 10 exceeds a prescribed threshold value corresponding to reference voltage Sth. For example, the voltage at the connection point between MOS transistor Q1 and one end of inductor L1 is detected, and the detected voltage is compared with reference voltage Sth. The voltage at the connection point drops when current flows through MOS transistor Q1. As a result, a signal SC, which is at the high level if the current flowing through inductor L1 is greater than a prescribed threshold value and is of the low level if the current is less than the prescribed level, is output corresponding to the comparison result. Current judgment circuit 40 can be constituted with a comparator as shown in FIG. 1. Comparator 41 compares the voltage at the connection point between MOS transistor Q1 and one ends of inductor L1 with reference voltage Sth and outputs the comparison result as signal SC. In other words, comparator 41 outputs signal SC at the high level if the voltage is below reference voltage Sth and outputs signal SC at the low level if the voltage exceeds ideal voltage SE.

PWM Feedback Circuit 51:

PWM feedback circuit 51 determines whether the output voltage Vout of switching converter circuit 10 is below a prescribed target value. For example, voltage Vout is detected and compared with the target value. Signal SA is output at the high level if voltage Vout is below the target value and is output at the low level if the voltage is higher than the target value. Since a fast response and accurate control are required for PWM, PWM feedback circuit 51 can be constituted with Gm amplifier GMA serving as an "error amplifier" and resistors R1, R2, as shown in FIG. 2. Resistors R1 and R2 are connected in series between the output terminal To of switching converter circuit 10 and reference potential VSS and divide output voltage Vout in accordance with their resistance ratio. Gm amplifier GMA compares the voltage at the connection point between resistors R1 and R2 with reference voltage Vref1 and outputs the comparison result as signal SA. In other words, if the voltage at the connection point is lower than reference voltage Vref1, signal SA is output at the high level. If the voltage is higher than reference voltage Vref1, signal SA is output at the low level. Signal SA indicates "the first control level signal" and is referred to as the PWM difference signal. PWM difference signal SA indicates an almost constant DC voltage when it is constant, that is, when there is no variation in the load of switching converter circuit 10. However, if there is a variation in the load, the magnitude of the signal will vary correspondingly.

PFM Feedback Circuit 52:

PFM feedback circuit 52 has resistors R4 and R5 in order to divide output voltage Vout in the same way as PWM feedback circuit 51. In the case of PFM operation, however, since the response and accuracy necessary for PWM operation is not required, generic comparator 53 is used instead of Gm amplifier GMA. Resistors R4 and R5 are connected in series between the output terminal To of switching converter circuit 10 and reference potential VSS to divide output voltage Vout in accordance with their resistance ratio. Comparator 53 compares the voltage generated at the connection point between resistors R4 and R5 with reference voltage Vref2 supplied from a DC power supply (not shown in the figure) and outputs the comparison result as digital (binary) signal SB. Comparator 53 outputs signal SB at the high level if the voltage at the connection point is lower than reference voltage Vref2 and outputs signal SB at the low level if the voltage is higher than reference voltage Vref2. Signal SB indicates the "second control level signal" and is referred to as a PFM difference signal hereinafter. PFM difference SB indicates an almost constant DC voltage when it is constant, that is, when there is no variation in the load of switching converter circuit 10. However, the voltage level varies corresponding to the input/output voltage difference. When there is variation in the output load, the input/output voltage difference also varies correspondingly. Therefore, the voltage level changes.

Capacitor CC and Capacitor-Connecting Switch SW:

Capacitor CC is connected in series with resistor R6 via switch SW between the generation node ND of PWM difference signal SA and VSS potential. Capacitor CC is used for phase compensation of the PWM feedback loop controlled at high frequency. Capacitor-connecting switch SW switches the charge accumulating node of capacitor CC between the side of resistor R6 and the output side of voltage generating circuit 30. The switch is controlled by mode signal SF sent from operating mode judgment circuit 20. When mode signal SF indicates PWM mode, capacitor CC is connected to the generation node of PWM difference signal SA via resistor R6. When mode signal SF indicates PFM mode, capacitor CC is connected to the output of voltage generating circuit 30.

Figure 3:
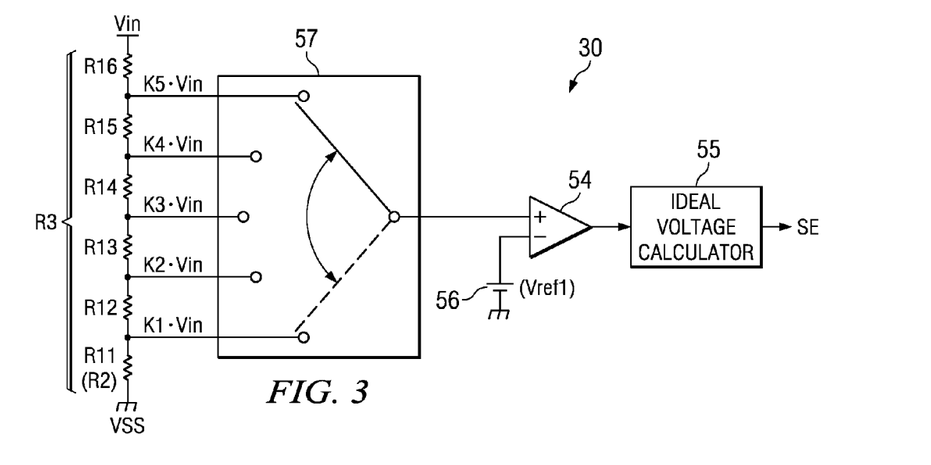
FIG. 3 is a circuit diagram illustrating an example of a voltage generating circuit usable in the device of FIG. 1.

Voltage Generating Circuit 30:

Voltage generating circuit 30, like capacitor-connecting switch SW, is a novel design in this embodiment. Voltage generating circuit 30 detects the level difference of input voltage Vin or output voltage Vout with respect to the target value, predicts the voltage present at the generation node ND of PWM difference signal SA when switching from PFM to PWM corresponding to the detection result, and generates that voltage in advance. Since the output will vary correspondingly to the input variation, it is desired to use input voltage Vin in order to generate a more accurate voltage. In the example shown in FIG. 2, voltage generating circuit 30 comprises comparator 54, ideal voltage calculator 55 serving as the calculating circuit, and two resistors R2 and R3. Reference voltage Vref1 generated by DC current source 56 is input to comparator 54. Reference voltage Vref1 is compared with the voltage obtained by dividing input voltage Vin with the resistive voltage divider. A resistor string type ADC (analog-to-digital converter) is used as the level judgment circuit. FIG. 3 shows a configuration example.

FIG. 3 is a circuit diagram illustrating a configuration example of voltage generating circuit 30. Voltage generating circuit 30 shown in the figure has a resistor string comprised of element resistors connected in series, selection circuit 57 that selects one of the nodes between the element resistors and connects it to the output, comparator 54, and ideal voltage calculator 55. As shown in FIG. 3, the resistor string is comprised of six element resistors R11, . . . , R16 connected in series between input terminal Ti and reference voltage VSS. The resistor string with the configuration divides the input voltage Vin according to five voltage division ratios K1-K5. The divided voltages ("K1·Vin", . . . , "K5·Vin") are generated at the various connection points between element resistors R11-R16. Selection circuit 57 selects and outputs a voltage in order from voltages (K1·Vin, . . . , K5·Vin) divided by the resistor string. The output of selection circuit 57 is connected to the non-inverting "+" input of comparator 54, and voltage source 56 that generates reference voltage Vref1 is connected to the inverting "−" input. Comparator 54 compares the output voltage of the resistor string selected by selection circuit 57 sequentially with reference voltage Vref1. Ideal voltage calculator 55 is connected to the output of comparator 54. Ideal voltage calculator 55 generates ideal voltage SE based on the comparison result of comparator 54 corresponding to each of voltages (K1·Vin, . . . , K5·Vin) divided by the resistor string. Ideal voltage calculator 55 can be constituted using a latch circuit that stores the five comparison results output from comparator 54 as binary codes, a data conversion circuit that converts the binary codes stored in the latch circuit into binary threshold value data (data indicating the transition point between "1" and "0"), and an analog-to-digital converter that converts the threshold value data output from the data conversion circuit into ideal voltage SE from an analog voltage.

Voltage generating circuit 30 uses the same reference voltage Vref1 that is used in PWM feedback circuit 51. In this case, since the value of reference voltage Vref1 is proportional to the output voltage Vout, the ratio between input voltage Vin and output voltage Vout can be obtained by comparing input voltage Vin and reference voltage Vref1. Ideal voltage calculator 55 can calculate ideal voltage SE corresponding to the ratio. The ideal voltage SE is held by capacitor CC connected to the output of ideal voltage calculator 55. Then, ideal voltage SE is set at node ND as a result of switching performed by capacitor-connecting switch SW.

Main Control Part 60:

As shown in FIG. 2, main control part 60 includes comparator 61 and triangle wave generating circuit 62 (a sawtooth wave generator is also an option) in PWM control part 60P. The voltage at node ND is input to the non-inverting "+" input of comparator 61 and inputs the triangle wave generated by triangle wave generating circuit 62 is input to the inverting "−" input. As a result, a rectangle wave obtained by comparing the triangle wave with PWM difference signal SA is output from the comparator 61. The rectangle wave has a fixed period, and its duty ratio is determined by the level of PWM difference signal SA with respect to the peak-to-peak slope of the triangle wave. A rectangle wave with a duty ratio of 1 is obtained at the peak-to-peak central level of the triangle wave. The duty ratio increases or decreases from 1 as the level shifts away from the central level. PWM control part 60P executes control by applying the rectangle wave (or its inverted signal) to MOS transistors Q1, Q2, Q4 according to three operations, that is, the step-down operation, step-up operation, and step-up/step-down operation.

As described above, PWM control part controls the current magnitude accumulated in inductor L1 or discharged from inductor L1 by fixing the switching frequency but varying the on duty ratio of the switch element. In this way, output voltage Vout can be controlled. Since the control continuously turns on and off the switch element as the control object (MOS transistor) consecutively, the power consumption is high. For the battery connected to the side of input voltage Vin, however, if the load of the electronic device connected to the side of output voltage Vout is high and its power consumption is large, the switching power supply device does not have the disadvantage of high power consumption. On the other hand, PWM has high control efficiency. Output voltage Vout can be kept constant even if input voltage Vin varies.

Main control part 60 has logic circuit 63 in the PFM control part 60F. If output voltage Vout is lower than the target value determined by reference voltage Vref2, PFM difference signal SB goes to the high level. The high level is detected by logic circuit 63, which outputs a trigger (rising edge of a pulse). This generates a pulse that turns on (or off) the switch element as the control object in switching converter circuit 10 at each trigger. As a result, for example, the voltage is stepped up once so that output voltage Vout rises. If output voltage Vout rises high enough, logic circuit 63 will not generate a trigger. However, if output voltage Vout does not rise high enough, a trigger will be generated again to boost the voltage. Similarly, in the case of stepping down the voltage, the step-down timing is determined while monitoring the output.

The timing for turning on (or off) the switch element (MOS transistor in switching converter circuit 10) for PFM control is fixed. Inductor L1 varies corresponding to the input/output voltage difference. Therefore, it is necessary to prevent large currents from flowing through inductor L1 at any one time. Consequently, current judgment circuit 40 shown in FIG. 1 is adopted in this embodiment to limit the peak current flowing through inductor L1. The PFM controls the magnitude of the current accumulated in inductor L1 or discharged from inductor L1 by keeping the switching time for stepping up or down the voltage constant but varying the switching frequency. In this way, output voltage Vout can be controlled. Since it is a type of intermittent control with a fixed period for turning on and off the switch element as the control object (MOS transistor), the power consumption is low. However, the control efficiency is low, and it can only handle low loads.

Main control part 60 can activate PWM control part 60P or PFM control part 60F corresponding to the mode signal SF sent from operating mode judgment circuit 20 and can switch the MOS transistor that is kept on, the MOS transistor that is kept off, and the MOS transistor that is switched in switching converter circuit 10 corresponding to the three operations, that is, voltage step-up, step-down, and step-up/step-down.

Figure 4:
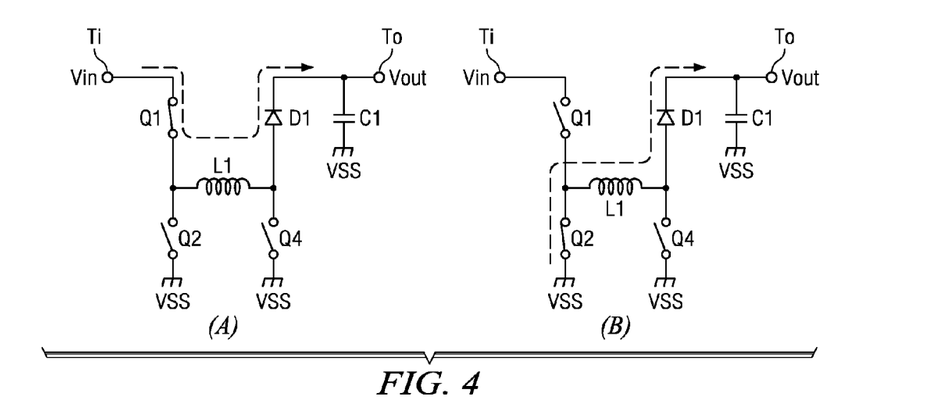
FIG. 4 is a diagrams illustrating steps (A) and (B) in a step-down operation of the switching converter circuit.

The operation of the switching power supply device disclosed in this embodiment with the aforementioned configuration is explained below:

First, the step-up/step-down operation of switching converter circuit 10 will be explained. FIG. 4 shows the state of each transistor in switching converter circuit 10 during the step-down operation. As shown in FIG. 4, MOS transistor Q4 is kept off. MOS transistors Q1 and Q2 are turned on/off alternately. When MOS transistor Q1 is turned on and MOS transistor Q2 is turned off (FIG. 4(A)), input Ti is connected to output terminal To via inductor L1. In the step-down operation, since input terminal Ti is at a higher potential than output terminal To, diode D1 is forward-biased and on. When diode D1 is on, a voltage corresponding to the difference between input Vin and output Vout is applied across inductor L1, which stores current from input terminal Ti (first state). On the other hand, when MOS transistor Q2 is on and MOS transistor Q1 is off (FIG. 4(B)), inductor L1 is cut off from input terminal Ti and is connected to reference potential VSS. In this way, the current stored in inductor L1 is released to capacitor C1 via diode D1 (second state).

Figure 5:
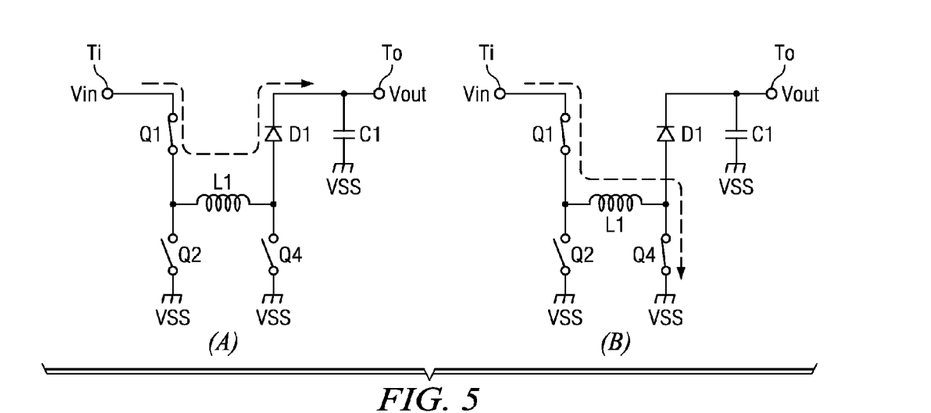
FIG. 5 is a diagram illustrating steps (A) and (B) in a step-up operation of the switching converter circuit.

FIG. 5 shows the state of each transistor in switching converter circuit 10 during the step-up operation. As shown in FIG. 5, during the step-up operation, MOS transistor Q1 is kept on, and MOS transistor Q2 is kept off. When MOS transistor Q4 is turned on (FIG. 5(B)), inductor L1 is connected between input terminal Ti and reference potential VSS. In this way, input voltage Vin is applied across inductor L1, which stores current from input terminal Ti (first state). On the other hand, when MOS transistor Q4 is turned off (FIG. 5(A)), inductor L1 is cut off from reference potential VSS and is connected to output terminal To via diode D1. In this way, the current stored in inductor L1 is released to capacitor C1 through diode D1 (second state).

In the following, the control of switching converter circuit 10 by switch control circuit 50 is explained. Since the function of each part has been explained, the operation of switching from PFM mode to PWM mode is explained.

Figure 6:
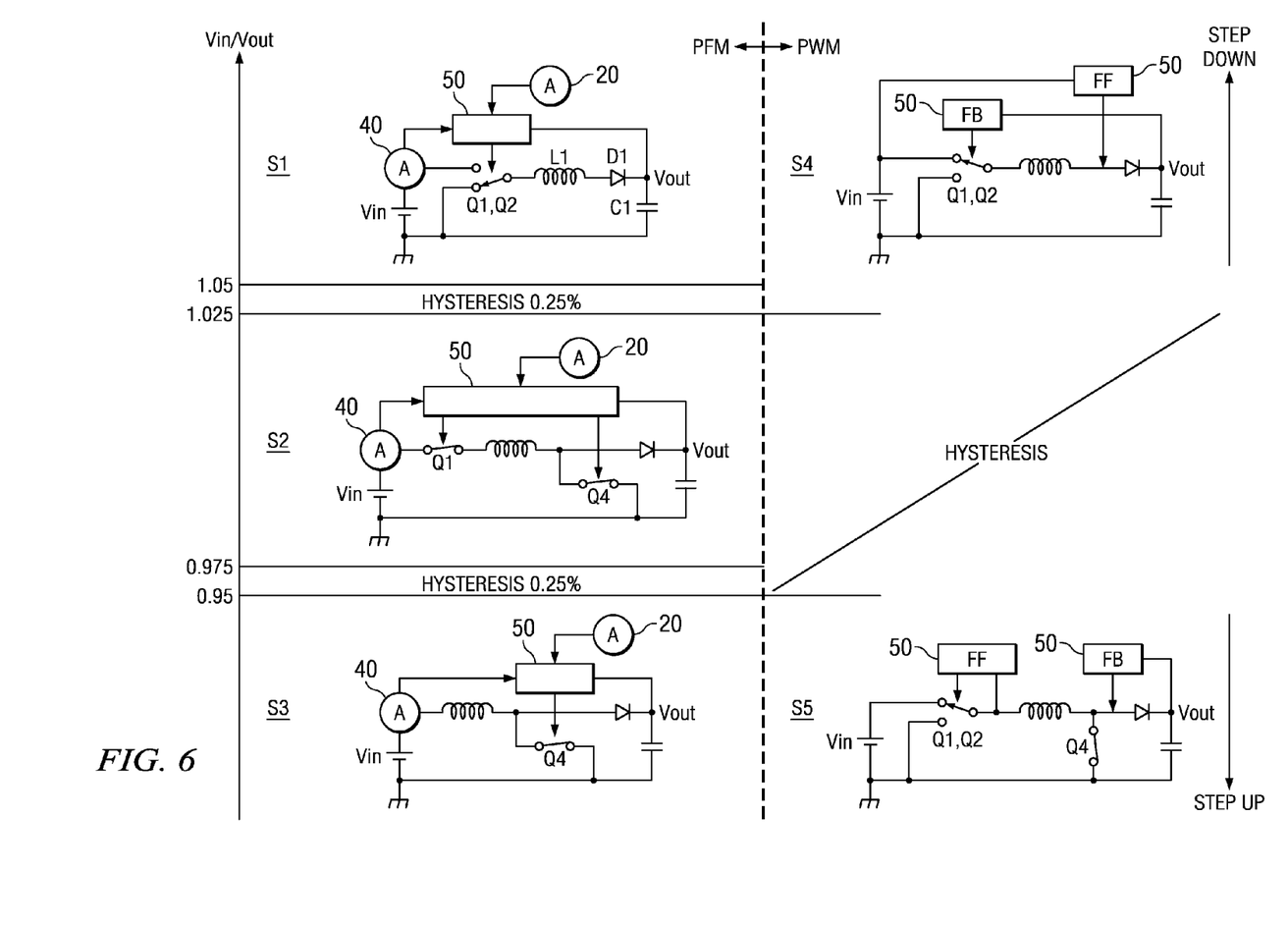
FIG. 6 is a diagram illustrating the relationship between the input/output voltage ratio and the circuit operation.

In this embodiment, in order to switch modes smoothly, for example, as shown in FIG. 1, capacitor-connecting switch SW and voltage generating circuit 30 are used. First, operation with these parts inactivated will be explained. Then, operation with the parts activated will be explained. The two cases will then be compared by observing the waveforms in a circuit simulation. FIG. 6 schematically shows the relationship between input/output voltage ratio (Vin/Vout) and voltage step-up, step-down, step-up/step-down. In FIG. 6, only the control part of the switching converter circuit 10 is shown. Label S4 represents the circuit control state during the step-down operation in PWM mode. During the step-down operation in PFM mode, MOS transistors Q1, Q2 can be controlled to perform feedback (FB) control carried out on the basis of output voltage Vout, while MOS transistor Q4 can be controlled to perform feedforward (FF) control carried out based on the basis of input voltage Vin.

In the case of the step-down operation, Vin/Vout=1/D is obtained from the relationship formula of the PWM switching regulator using the duty ratio D (on duty) of the signal supplied to the switch element as the control object. In this case, duty ratio D can be varied as a function of the output voltage (PWM difference signal SA) of Gm amplifier GMA shown in FIG. 2. The input/output voltage ratio (Vin/Vout) increases as a result of the step-down operation. On the other hand, symbol S5 represents the circuit control state during the step-up operation in PWM mode. In this case, the control objects of FB and FF are MOS transistor Q4 and MOS transistors Q1, Q2, respectively, which are reversed as compared with the state S4.

In the case of the step-up operation, Vin/Vout=1-D is obtained from the relationship formula of the PWM switching regulator using the duty ratio D (on duty) of the signal supplied to the switch element as the control object. In this case, duty ratio D can be varied as a function of the output voltage (PWM difference signal SA) of Gm amplifier GMA shown in FIG. 2. The input/output voltage ratio (Vin/Vout) decreases as a result of the step-up operation.

It is possible to prevent an alternating repetition of the step-up operation and the step-down operations over a short period of time in order to stabilize the operation by adopting hysteresis based on the threshold value of the input/output voltage ratio (Vin/Vout) when switching from the step-up to the step-down and vice versa. Switch control circuit 50 has this function.

Label S1 represents the circuit control state during the step-down operation in PFM mode. In this case, the circuit symbol of the ammeter represents the function of operating mode judgment circuit 20 and current judgment circuit 40. MOS transistor Q4 is omitted since it is always on. Switch control circuit 50 controls MOS transistors Q1 and Q2. Label S3 represents the circuit control state during the step-up operation in PFM mode. During the step-up operation, MOS transistor Q1 is always on and MOS transistor Q2 is always off and are therefore omitted. Switch control circuit 50 controls MOS transistor Q4. Label S2 represents the circuit control state during step-up/step-down operation in PFM mode. During the step-up/step-down operation, switch control circuit 50 controls MOS transistors Q1, Q2 and MOS transistor Q4. This operation can be performed if it is desired to suppress ripple and improve responsiveness. However, the power consumption is high.

It is also desirable to adopt hysteresis during the transition between the step-up and step-down operations in PFM mode.

Figure 11:
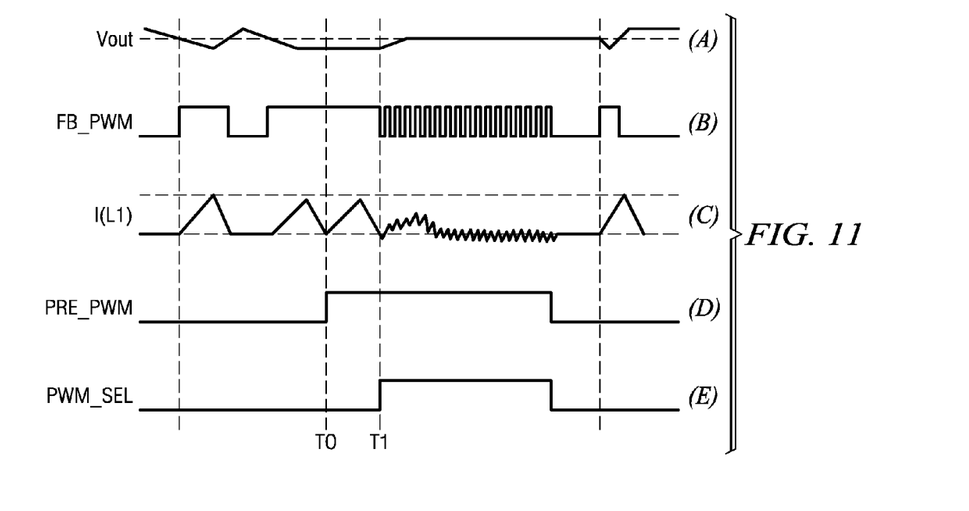
FIG. 11 is a diagram to consider with FIG. 6, illustrating at (A)-(E) waveform diagrams of the signals (voltage, etc.) when the pre-start (preparation) of the Gm amplifier is performed before the invention is applied.

FIG. 11 shows the waveform diagrams (A)-(E) during the transition from PFM to PWM modes. FIG. 11 at (A) shows the output voltage Vout. FIG. 11 at (B) shows the waveform of control signal FB_PWM obtained from comparators 61 and 63 shown in FIG. 2. In this case, comparators 61 and 63 can be used by using one common comparator. FIG. 11 at (C) shows the current flowing through inductor L1 (coil current) I(L1). FIG. 11 at (D) and (E) shows the switching signals to PWM mode.

FIG. 6 shows the waveform diagrams (B)-(F) during the transition from PFM to PWM modes. FIG. 6 at (B) shows the output voltage Vout. FIG. 6 at (C) shows the waveform of control signal FB_PWM obtained from comparators 61 and 63 shown in FIG. 2. In this case, comparators 61 and 63 can be used by using one common comparator. FIG. 6 at (D) shows the current flowing through inductor L1 (coil current) I(L1). FIG. 6 at (E) and (F) shows the switching signals to PWM mode.

In PFM mode, coil current I(L1) starts to flow when triggered by the rise of control signal FB-PWM. Its upper limit level is determined. Also, the coil current flows intermittently and hence does not have a fixed period. Therefore, the responsiveness to the control for making output voltage Vout approach the target value is poor. The mode is switched from PFM to PWM at time T1 when PWM mode selection signal PWM_SEL is enabled. At that time, in the circuit shown in FIG. 2, Gm amplifier GMA returns to the power supply state from the power halted or idling state, during which a very small current flows. However, the potential at node ND is not fixed and is determined by the state when going from PWM to PFM in the last cycle. Consequently, the initial drive capability of Gm amplifier GMA with respect to the potential is excessive or insufficient. As a result, output voltage Vout is overshot or undershot. In order to avoid this problem, it is necessary to switch the mode of the circuit at time T1 after passing a pre-start period, during which Gm amplifier GMA is started at time T0 prior to time T1 by PWM pre-operation signal PRE_PWM.

Figure 7:
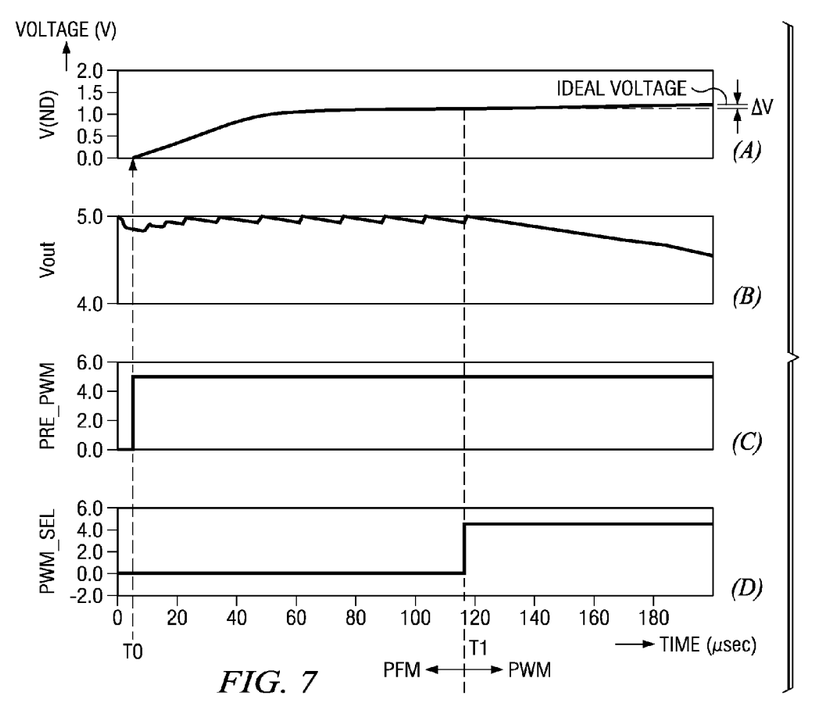
FIG. 7 illustrates signal waveform diagrams (A)-(D) obtained from the simulation before the invention is applied.

FIG. 7 shows the circuit simulation results when a sufficient pre-start period is used. FIG. 7 at (A) shows the voltage at node ND. FIG. 7 at (B) shows output voltage Vout. FIG. 7 at (C) shows PWM pre-operation signal PRE_PWM. FIG. 7 at (D) shows PWM mode selection signal PWM_SEL.

Gm amplifier GMA is started at time T0. If the mode is switched at time T1 after the pre-start period has passed, the pre-start period will have been long enough, as seen from the waveform of node voltage V (ND) at node ND shown in FIG. 7 at (A). In fact, however, even after time T1 has passed, node voltage V (ND) continues to rise little by little. There is a small voltage difference ΔV from the ideal voltage. Due to the voltage difference ΔV, the output voltage Vout will undershot and drop after the PWM control occurs as shown in FIG. 7 at (B).

Figure 8:
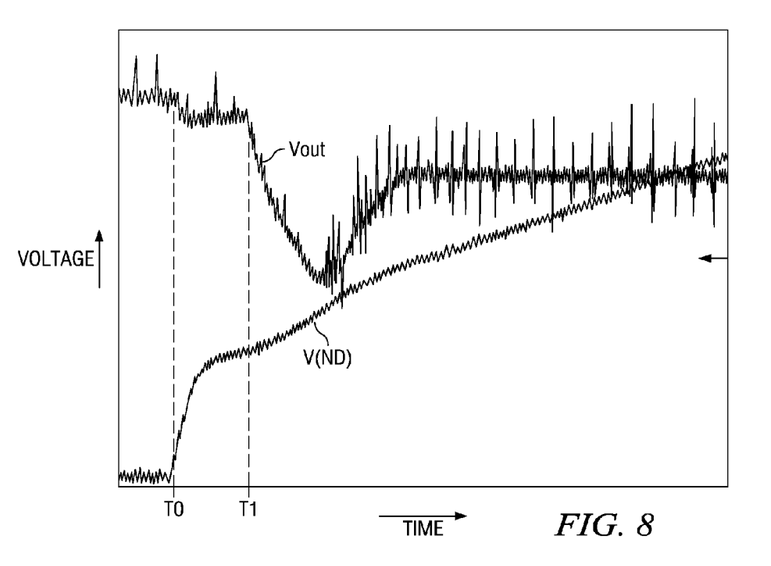
FIG. 8 is an evaluation waveform diagram before the invention is applied.

If the same phenomenon is studied using the actual evaluation waveform, as shown in FIG. 8, it is found that the pre-start period of Gm amplifier GMA must be extended from output voltage Vout several times to reach a stable state to eliminate the undershoot. The fact that a long pre-start period is needed hinders the desired improved efficiency and responsiveness of the switching power supply when switching between PFM and PWM and thus hinders reduced power consumption.

In the following, variations in the simulation results for starting the functions of capacitor-connecting switch SW and voltage generating circuit 30 shown in FIG. 2 and variations in the evaluation waveforms are described.

Figure 9:
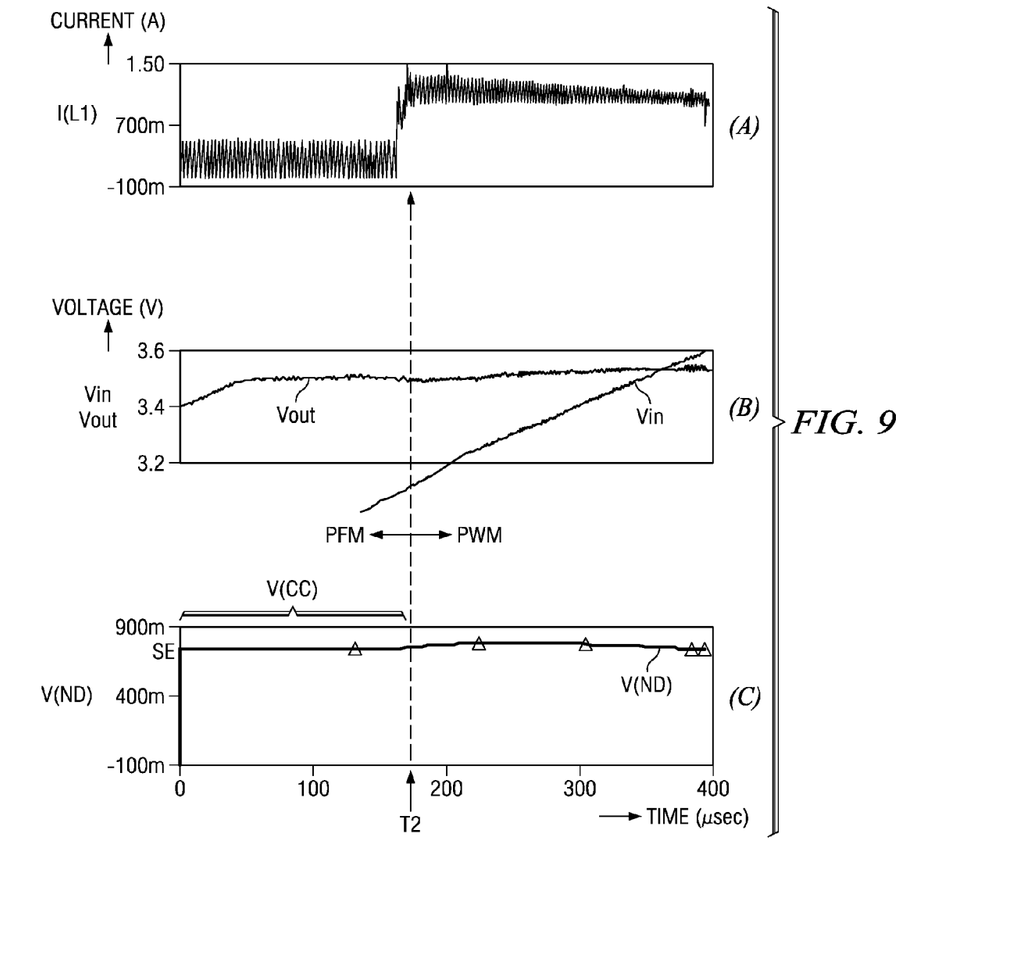
FIG. 9 illustrates signal waveform diagrams (A)-(C) obtained from the simulation after the invention is applied.

FIG. 9 at (A) shows the variation in coil current I(L1) over time. FIG. 9 at (B) shows the variations in input voltage (Vin) and output voltage (Vout) over time. FIG. 9 at (C) shows the variation in node voltage V (ND) over time. In this case, since ideal voltage SE is calculated by ideal voltage calculator 55 shown in FIG. 2, the ideal voltage SE is set in capacitor CC before mode switching is performed at time T2 shown in FIG. 9 (FIG. 9 at (C) shows the voltage V(CC) held by capacitor CC). As shown in FIG. 9 at (A), when the mode is switched from PFM to PWM, coil current I(L1) increases sharply from 0.1 A to 1 A. Output voltage Vout has only 20 mv of ripple. Serious overshoot or undershoot will not occur.

Figure 10:
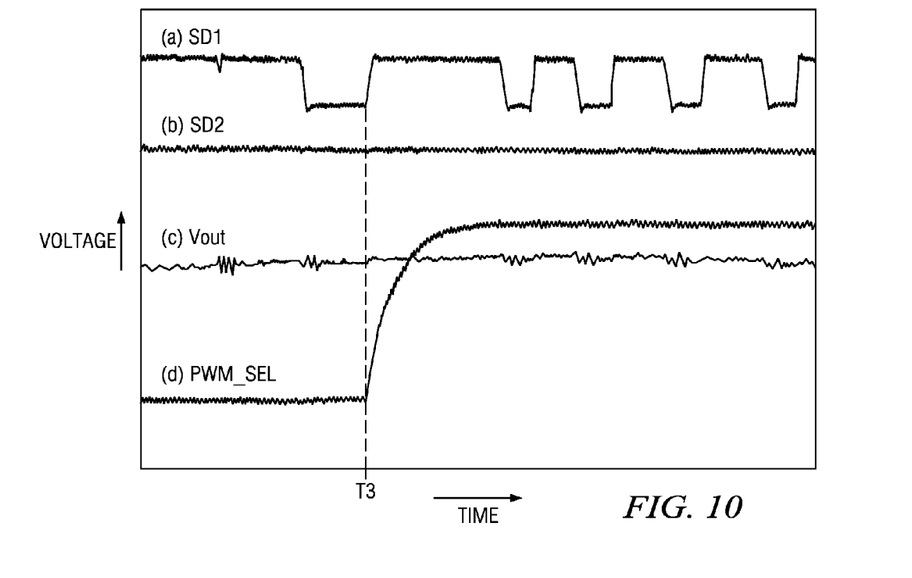
FIG. 10 is an evaluation waveform diagram after the invention is applied.

FIG. 10 shows the evaluation waveform. In this figure, (a) and (b) show the waveforms of switch control signals SD1 and SD2 shown in FIGS. 1 and 2. Also, (c) represents the waveform of output voltage Vout. At (d), FIG. 10 shows the waveform of PWM mode selection signal PWM_SEL. The mode is switched from PFM to PWM at time T3. However, since the output voltage Vout is relatively undisturbed, stable control can be maintained.

According to this embodiment, the ideal voltage for the output of the Gm amplifier in PWM mode is pre-calculated by the voltage generating circuit. The ideal voltage is held by a capacitor cut off from the output of the Gm amplifier during switching from PFM to PWM or a slightly earlier than the mode switching. In this way, even if capacitor CC is connected for phase compensation, mode switching can be performed stably and smoothly. Consequently, the invention provides a switching power supply device that exhibits good responsiveness and that can suppress ripple and unnecessary power consumption.

Also, with the invention, it is also possible to use a MOS transistor that is turned on and off under the control of main control part 60 instead of diode D1.

Those skilled in the art to which the invention relates will appreciate that the described embodiments are just some representative ones of the many ways in which the principles of the claimed invention may be implemented.

What is claimed is:

1. A switching power supply device, comprising:
   an input terminal and an output terminal;
   an inductor arranged between the input terminal and output terminal;
   a plurality of switch elements connected, adapted and configured for switching a power input path to the inductor and a power output path from the inductor;
   a switch control circuit connected, adapted and configured to have a control level signal responsive to a difference between an output voltage converted from an input voltage applied to the input terminal and an output from the output terminal and a prescribed target value; the switch control circuit connected, adapted and configured to control the output voltage to approach the target value based on the control level signal by turning on or off the plurality of switch elements; and further connected, adapted and configured to switch between an intermittent control mode and a continuous control mode based on an input mode signal;
   a capacitor connected to a voltage generation node for the control level signal in the switch control circuit during the continuous control mode;
   a voltage generating circuit that detects the level difference of the input voltage or output voltage with respect to the target value and generates an ideal voltage corresponding to the detection result; and
   a capacitor-connecting switch connected, adapted and configured to connect and disconnect the capacitor to and from a voltage generation node for the control level signal based on the mode signal, to connect the capacitor to the output of the voltage generating circuit during the disconnection, and to set the ideal voltage generated at the output for the next connection and preset it for the capacitor.

2. The device of claim 1, wherein the voltage generating circuit includes:
   an input level judgment circuit connected, adapted and configured to use the target voltage or a voltage proportional to the target voltage as a reference voltage, vary the reference voltage and compare it with the input voltage, and obtain an output indicating the input signal level from the comparison result; and
   a calculating circuit connected, adapted and configured to calculates and outputs the ideal voltage from the output of the input level judgment circuit.

3. The device of claim 2, wherein the switch control circuit comprises:
   a first feedback circuit connected, adapted and configured to generate a first control level signal for use during the continuous control mode by feeding back and detecting the output voltage; and
   a second feedback circuit connected, adapted and configured to generate a second control level signal for use during the intermittent control mode by feeding back and detecting the output voltage;
   wherein the capacitor-connecting switch controls the connection and disconnection of the capacitor with respect to the voltage generation node for the first control level signal.

4. The device of claim 3, wherein:
   the first feedback circuit is an error amplifier circuit connected, adapted and configured to compare the output voltage with the target value or a voltage proportional to the target value, to generate the first control level signal corresponding to the comparison result, and to shifts from a power supply state to a power halted idling state when the mode signal indicates a switch from the continuous control mode to the intermittent control mode; and
   the second feedback circuit is a comparator connected, adapted and configured to compare the output voltage with the target value or a voltage proportional to the target value, and to output the comparison result as the second control level signal.

5. The device of claim 4, wherein the device is further connected, adapted and configured so that:
   a voltage obtained by lowering the output voltage using a resistive voltage divider is input into the comparator; and
   a voltage obtained by lowering the target voltage with the same resistance ratio of the resistive voltage divider is input as a common reference voltage to the comparator and the voltage generating circuit.

6. The device of claim 5, wherein the voltage obtained by lowering the output voltage using the resistive voltage divider is input to the error amplifier and comparator, and
   the voltage obtained by lowering the target voltage with the same resistance ratio of the resistive voltage divider is input as a common reference voltage to the error amplifier, comparator, and voltage generating circuit.

7. The device of claim 6, further comprising:
   a monitor connected, adapted and configured to monitor the voltage or current in the path from the inductor to the output terminal; and
   a mode control circuit connected, adapted and configured to generate the mode signal based on the monitor.

8. The device of claim 2, wherein the switch control circuit includes a comparator connected, adapted and configured to compare the output voltage with the target value or a voltage proportional to the target value, and to output the comparison result as the control level signal to the switch control circuit.

9. The device of claim 1, further comprising:
   a monitor connected, adapted and configured to monitor the voltage or current in the path from the inductor to the output terminal; and a mode control circuit connected, adapted and configured to generate the mode signal based on the monitor.

10. The device of claim 1, wherein the switch control circuit comprises:
a first feedback circuit connected, adapted and configured to generate a first control level signal for use during the continuous control mode by feeding back and detecting the output voltage; and
a second feedback circuit connected, adapted and configured to generate a second control level signal for use during the intermittent control mode by feeding back and detecting the output voltage;
wherein the capacitor-connecting switch controls the connection and disconnection of the capacitor with respect to the voltage generation node for the first control level signal.

11. The device of claim 10, wherein:
the first feedback circuit is an error amplifier circuit connected, adapted and configured to compare the output voltage with the target value or a voltage proportional to the target value, to generate the first control level signal corresponding to the comparison result, and to shifts from a power supply state to a power halted idling state when the mode signal indicates a switch from the continuous control mode to the intermittent control mode; and
the second feedback circuit is a comparator connected, adapted and configured to compare the output voltage with the target value or a voltage proportional to the target value, and to output the comparison result as the second control level signal.

12. The device of claim 11, wherein the device is further connected, adapted and configured so that:
a voltage obtained by lowering the output voltage using a resistive voltage divider is input into the comparator; and
a voltage obtained by lowering the target voltage with the same resistance ratio of the resistive voltage divider is input as a common reference voltage to the comparator and the voltage generating circuit.

13. The device of claim 12, wherein the voltage obtained by lowering the output voltage using the resistive voltage divider is input to the error amplifier and comparator, and
the voltage obtained by lowering the target voltage with the same resistance ratio of the resistive voltage divider is input as a common reference voltage to the error amplifier, comparator, and voltage generating circuit.

14. The device of claim 13, further comprising:
a monitor connected, adapted and configured to monitor the voltage or current in the path from the inductor to the output terminal; and
a mode control circuit connected, adapted and configured to generate the mode signal based on the monitor.

15. The device of claim 12, further comprising:
a monitor connected, adapted and configured to monitor the voltage or current in the path from the inductor to the output terminal; and
a mode control circuit connected, adapted and configured to generate the mode signal based on the monitor.

* * * * *